United States Patent
Yu et al.

(10) Patent No.: US 11,132,468 B2
(45) Date of Patent: Sep. 28, 2021

(54) SECURITY PROCESSING UNIT OF PLC AND BUS ARBITRATION METHOD THEREOF

(71) Applicant: SHENYANG INSTITUTE OF AUTOMATION, CHINESE ACADEMY OF SCIENCES, Liaoning (CN)

(72) Inventors: Haibin Yu, Liaoning (CN); Peng Zeng, Liaoning (CN); Xianda Liu, Liaoning (CN); Jianming Zhao, Liaoning (CN); Tianyu Wang, Liaoning (CN); Bowen Zhang, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 330 days.

(21) Appl. No.: 16/316,205

(22) PCT Filed: Jun. 7, 2018

(86) PCT No.: PCT/CN2018/090198
§ 371 (c)(1),
(2) Date: Jan. 8, 2019

(87) PCT Pub. No.: WO2019/104988
PCT Pub. Date: Jun. 6, 2019

(65) Prior Publication Data
US 2020/0042747 A1 Feb. 6, 2020

(30) Foreign Application Priority Data
Nov. 28, 2017 (CN) .......................... 201711212359.5

(51) Int. Cl.
*H04L 29/00* (2006.01)
*G06F 21/72* (2013.01)
(Continued)

(52) U.S. Cl.
CPC ............ *G06F 21/72* (2013.01); *G06F 9/5011* (2013.01); *G06F 13/362* (2013.01);
(Continued)

(58) Field of Classification Search
CPC .. G06F 2221/034; G06F 21/72; G06F 9/5011; G06F 13/362; G06F 21/554; G06F 21/602; G06F 21/64
See application file for complete search history.

(56) References Cited

U.S. PATENT DOCUMENTS

| 7,134,118 | B1 * | 11/2006 | McNutt | G06F 15/7814 717/138 |
| 2009/0113220 | A1 * | 4/2009 | Lee | G06F 21/81 713/193 |
| 2015/0331407 | A1 * | 11/2015 | Lee | G05B 19/056 700/86 |

FOREIGN PATENT DOCUMENTS

| CN | 101276297 | * 10/2008 |
| CN | 102436566 A | 5/2012 |

(Continued)

*Primary Examiner* — Ghazal B Shehni
(74) *Attorney, Agent, or Firm* — Novick, Kim & Lee, PLLC; Allen Xue (57) ABSTRACT

The present invention relates to a security processing unit of PLC and a bus arbitration method thereof, to provide PLC with an active defense means to build a PLC hardware and software security layer. On a hardware security layer, a part of hardware processing mechanism is added to support trusted measurement, encryption algorithms and signature algorithms, and a virtual isolation technology is used; and on a software security layer, transparent encryption and decryption, integrity verification, backup recovery and virtual isolation security mechanism are provided. The security processing aspect is improved to achieve the purpose of security and reliability. The present invention can correctly establish a trusted environment of PLC to ensure that PLC (Continued)

is guided by a strictly verified path. A new star type trusted structure is designed to reduce loss during information transmission and increase information transmission efficiency.

8 Claims, 10 Drawing Sheets

(51) Int. Cl.
　　　*G06F 9/50*　　　(2006.01)
　　　*G06F 13/362*　　(2006.01)
　　　*G06F 21/55*　　 (2013.01)
　　　*G06F 21/60*　　 (2013.01)
　　　*G06F 21/64*　　 (2013.01)
(52) U.S. Cl.
　　　CPC .......... *G06F 21/554* (2013.01); *G06F 21/602* (2013.01); *G06F 21/64* (2013.01); *G06F 2221/034* (2013.01)

(56) References Cited

FOREIGN PATENT DOCUMENTS

| | | |
|---|---|---|
| CN | 104778141 A | 7/2015 |
| CN | 106775716 A | 5/2017 |

\* cited by examiner

SECURITY PROCESSING UNIT OF PLC AND BUS ARBITRATION METHOD THEREOF

TECHNICAL FIELD

The present invention relates to a system for ensuring the security of an information processing system of a PLC, comprising a hardware system and a software system of a security processor. The system is placed in a PLC main controller, solves the security problem of the PLC, allows the PLC to withstand remote code execution vulnerability attacks and information leakage vulnerability attacks, and belongs to the field of information security of industrial control systems.

BACKGROUND

PLC is a digital operational electronic system specially designed for application in industrial environments. The PLC adopts a programmable memory to store and execute instructions for operations such as logical operation, sequence control, timing, counting and arithmetic operations, and controls all kinds of mechanical devices or production processes through digital or analog input and output.

The PLC is widely used in various industries of steel and iron, petroleum, chemical industry, electric power, building materials, machinery manufacturing, automobiles, light textile, transportation, environmental protection and cultural entertainment, and is used as an electronic device of logic control of switching capacity, industrial process control, motion control, data processing and communication networking. However, for a long time, many people believe that the hardware system and the software system of the PLC are solidified, and there is no possibility of tampering or attack. Therefore, for the security problem of the PLC, the industry is more concerned about PLC network security. During network communication, an industrial firewall is only installed in front of the PLC for access control, or data encryption and decryption are conducted through a cipher algorithm, or simple means such as check codes and error correcting codes are used in the aspect of data transmission to ensure operating security of the PLC. However, with the stronger interconnection and interoperability between devices under the industrial control system, it is more and more important for the task role of the PLC, and higher and more comprehensive requirements are also put forward for the reliability of PLC hardware and the robustness of the operating system and application software. The traditional PLC system architecture has a lot of security risks mainly in the following aspects:

(1) remote code execution vulnerability attacks: malicious codes are hidden in normal data packets and sent to the PLC; the PLC may have memory leakage and execute the malicious codes; and an intruder can arbitrarily control the behavior of the PLC through the execution of the malicious codes;

(2) information leakage vulnerability attacks: a normal data connection is established between an operator station and the PLC to exchange non-sensitive data; and the intruder uses information leakage vulnerabilities to obtain sensitive process data.

The existing security technical means cannot solve the security problem of the PLC comprehensively, and security defense is passive. The present invention provides an active defense means for the PLC, builds a new embedded architecture and improves the security processing aspect to achieve the purpose of security and reliability.

SUMMARY

The first purpose of the present invention is to build a PLC hardware security layer. Hardware security is the foundation of device security. On the hardware security layer, measures for enhancing security include: a part of hardware processing mechanism is added to support trusted measurement, encryption algorithms and signature algorithms; a virtual isolation technology is used to isolate different application programs to enable the application programs to securely store information and operate. This isolation limitation can ensure that only reliable system components can access in security storage regions.

The second purpose of the present invention is to build a PLC software security layer. Software security comprises security of operating systems and all kinds of application software. The software security layer mainly enhances system security by enhancing the security of the operating systems and adopting the virtual isolation technology. The following security mechanisms are provided: (1) transparent encryption and decryption to satisfy autonomous confidentiality and off-line confidentiality requirements, i.e., satisfy confidentiality in data storage, processing and transmission, and to guarantee implementation of customized confidentiality policies and data ciphertext storage for users; (2) integrity verification to achieve integrity protection of application data; (3) backup recovery to ensure that the system can be recovered to its normal state after the system is destructed by outside factors; and (4) virtual isolation used to isolate application programs to enable the application programs to securely operate and store information.

The present invention adopts the following technical solution: the PLC security processing unit comprises: a bus arbitration chip used to allocate bus resources; a trusted chip used to provide a root of trust for measurement, a root of trust for storage, and a root of trust for reporting; a system storage chip used to save a start guidance file, an operating system kernel and an upper-layer application code; and a system backup chip used to save the backup start guidance file, operating system kernel and upper-layer application code.

The bus arbitration chip conducts bus arbitration on the bus resources; and when a plurality of PLC hardware platforms, trusted chips, system storage chips and system backup chips simultaneously occupy a shared bus to conduct data communication, the bus arbitration chip determines the use right of the bus resources.

The trusted chip stores the root of trust for measurement, the root of trust for storage, and the root of trust for reporting.

The root of trust for measurement is used to measure the guidance file, the operating system kernel and the upper-layer application.

The root of trust for storage is used to conduct the work of key production, key management, encryption and decryption to protect all keys and measurement information entrusted to the root of trust for storage.

The root of trust for reporting is used to allow a verified challenger to acquire data in a region protected by the trusted chip and to confirm validity of the data with signature keys.

The trusted chip adds an encryption module drive between a page high-speed caching layer and a common block layer which reserve a file system structure of an original system; and an encryption process is transparent for an upper-layer user, the data structure of the file system is not modified and the access process of the encrypted file by the user is not changed.

The system storage chip encrypts and regionally stores the guidance file, the system kernel and the upper-layer application; encrypted storage is to encrypt write data before practical memory write operation is executed; and regional storage is to separate regions which store system data and user data without changing each other.

The system backup chip is used to conduct integrity checking on the guidance file, the system kernel and the upper-layer application before the security processing unit starts PLC; and if checking is not passed, contents are regarded to have been tampered and system recovery is needed.

The system storage chip is used for virtual isolation; the start guidance file, the operating system kernel and the upper-layer application are placed in lowest addresses of the system storage chip in accordance with designated addresses; a drive file in a physical block device layer is modified; parameter pos is required to be judged when writing into the physical block device layer; if pos is less than m address, an error is directly returned to ensure write protection of this section of address content; and m value is required to be set in accordance with practical implementation.

A bus arbitration method for the security processing unit of PLC comprises the following steps:

a) activating a bus arbitration chip after the security processing unit is electrified;

b) acquiring a bus control right of the system storage chip by the bus arbitration chip;

c) reading the start guidance file, the operating system kernel and upper-layer application data in the system storage chip to Nand Flash buffer module in the bus arbitration chip;

d) acquiring the control right of the trusted chip by the bus arbitration chip, and measuring the integrity of the guidance file, the operating system kernel and the upper-layer application by the root of trust for measurement of the trusted chip;

e) if the measurement is trusted, acquiring the bus control right by the PLC hardware platform, reading the data of the Nand Flash buffer module, decrypting and loading into a memory, and starting the system; and f) if the measurement fails, recovering the system data and guiding again.

The root of trust for measurement of the trusted chip measures the integrity of the guidance file, the operating system kernel and the upper-layer application through the following steps:

a) reading a data block;

b) verifying a signature using an authentication key in a data block signature certificate; and c) returning a trusted result if verification is trusted; and stopping guiding if verification fails.

The bus arbitration method for the security processing unit of PLC also comprises a backup recovery method; when the system of the PLC hardware platform is started, the bus arbitration chip in the security processing unit is in a main control status; when starting, if the content in the system storage chip does not pass the verification, the bus arbitration chip issues a command and occupies the bus; backup recovery steps are as follows:

a) reading backup content from the system backup chip;

b) writing the backup content in the Nand Flash buffer module of the bus arbitration chip;

c) copying the data in the buffer module into the system storage chip;

d) setting write protection of the system storage chip by the bus arbitration chip to ensure that the information in the system storage chip is not modified and the size and the storage base address are set in the bus arbitration chip without being disclosed; and e) giving the bus control right to the system storage chip by the bus arbitration chip and guiding the system again after system recovery is completed.

The present invention has the following beneficial effects and advantages:

1. The present invention can correctly establish a trusted environment of PLC to ensure that PLC is guided by a strictly verified path.

2. The present invention designs a new star type trusted structure to reduce loss during information transmission and increase information transmission efficiency.

3. The present invention includes the bus arbitration chip which can ensure the main control status of the security processing unit. CPU start of PLC is allowed after integrity measurement is implemented on all start parts, thereby enhancing security.

4. The present invention designs the virtual isolation technology to isolate different application programs and data thereof to enable the application programs to securely store information and operate and only access own storage spaces.

DESCRIPTION OF DRAWINGS

In the figures: 1 security processing unit; 2 PLC hardware platform; 3 guidance file/BSP; 4 trusted hardware drive; 5 root of trust for storage; 6 root of trust for measurement; 7 root of trust for reporting; 8 backup recovery; 9 virtual isolation; 10 integrity verification; 11 transparent encryption and decryption; 12 bus arbitration chip; 13 trusted chip; 14 system storage chip; 15 system backup chip; 16 bus arbitration module; and 17 Nand Flash buffer module.

DETAILED DESCRIPTION

The present invention will be further described in detail below in combination with the drawings and the embodiments.

The security processing unit of the present invention comprises a bus arbitration chip, a trusted chip, a system storage chip and a system backup chip. The bus arbitration chip allocates bus resources and determines the use right of the bus resources. The trusted chip provides the root of trust for measurement, the root of trust for storage, and the root of trust for reporting. The root of trust for measurement is used to measure the integrity of bottom configuration, the upper-layer application, etc. in an embedded system. The root of trust for storage is used to conduct the work of key production, key management, encryption and decryption to protect all keys and measurement information entrusted to the root of trust for storage. The root of trust for reporting is used to allow a verified challenger to acquire data in a region protected by the trusted chip and to confirm validity of the data with signature keys. The system storage chip is used to virtually and regionally save a computer system guidance, an operating system kernel and an upper-layer application code. The system backup chip is a protected system backup memory, and encrypts and saves executable codes of the computer system guidance and the operating system.

A security processing unit for providing a trusted function for a PLC hardware platform comprises:

a bus arbitration chip used to allocate bus resources;

a trusted chip used to provide a root of trust for measurement, a root of trust for storage, and a root of trust for reporting;

a system storage chip used to save a start guidance file, an operating system kernel and an upper-layer application code; and a system backup chip used to save the backup start guidance file, operating system kernel and upper-layer application code.

The bus arbitration chip allocates the bus resources. When a plurality of main modules simultaneously occupy a shared bus to conduct data communication, the bus arbitration chip determines the use right of the bus resources. The main modules comprise, for example, a PLC hardware platform, a trusted chip, a system storage chip and a system backup chip.

The trusted chip stores the root of trust for measurement, the root of trust for storage, and the root of trust for reporting. The root of trust for measurement is used to measure the integrity of the guidance file, the operating system kernel and the upper-layer application. The root of trust for storage is used to conduct the work of key production, key management, encryption and decryption to protect all keys and measurement information entrusted to the root of trust for storage. The root of trust for reporting is used to allow a verified challenger to acquire data in a region protected by the trusted chip and to confirm validity of the data with signature keys.

The system storage chip encrypts and regionally stores the guidance file, the system kernel and the upper-layer application. The encrypted storage is to encrypt write data before practical memory write operation is executed. The regional storage is to separate regions which store system data and user data without changing each other.

The system backup chip is a protected system backup memory, and saves the guidance file of the PLC system, the system kernel and the upper-layer application. The security processing unit is used to conduct integrity checking on the guidance file, the system kernel and the upper-layer application before the PLC is started; and if checking is not passed, contents are regarded to have been tampered and system recovery is needed.

The bus arbitration chip also comprises a bus arbitration module and a Nand Flash buffer module.

The bus arbitration module is in a centralized arbitration manner. All of the main modules occupy the bus resources through an independent arbitration module. The bus arbitration module adopts a static arbitration algorithm in the arbitration process. The arbitration process is not influenced by the states of the main modules. One of the main modules occupying the bus resources is determined in accordance with a preset start process. The main modules comprise, for example, a PLC hardware platform, a trusted chip, a system storage chip and a system backup chip.

A bus arbitration start method is a PLC system start guidance method based on a trusted mechanism. The guidance method is to combine the PLC hardware platform with the security processing unit, make the system storage chip in the PLC hardware platform independent and control the system storage chip to read and write by the security processing unit. In the process of starting the PLC hardware platform, integrity verification is conducted on executable codes in the system storage chip by the security processing unit at first; and only after verification is passed, the security processing unit gives read and write rights of the system storage chip to the PLC hardware platform to allow to start the PLC hardware platform.

The bus arbitration chip is in a main control status after the system of the PLC hardware platform is started. During starting, if the content in the system storage chip does not pass the verification, the bus arbitration chip issues a command and occupies the bus; backup content is read from the system backup chip into the buffer module; and then the content in the buffer module is written into the system storage chip. The bus arbitration chip sets write protection of the system storage chip to ensure that the information in the system storage chip is not modified and the size and the storage base address are set in the bus arbitration chip without being disclosed. The system storage chip 14 acquires the bus control right to restart the guidance after system recovery is completed.

The bus arbitrate module controls the PLC hardware platform, the trusted chip, the system storage chip and the system backup chip to exchange data through the Nand Flash buffer module 17.

The bus arbitration starting steps are as follows:

a) activating a bus arbitration chip after the system is electrified;

b) acquiring a bus control right of the system storage chip by the bus arbitration chip;

c) reading the start guidance file, the operating system kernel and upper-layer application data to a data buffer module;

d) acquiring the control right of the trusted chip by the bus arbitration chip, and measuring the integrity of the guidance file, the operating system kernel and the upper-layer application by the root of trust for measurement of the trusted chip;

e) if the measurement is trusted, acquiring the bus control right by the PLC hardware platform, reading the data of the buffer module, decrypting and loading into a memory, and starting the system; and f) if the measurement fails, recovering the system data and guiding again.

The trusted chip measures the integrity of the guidance file, the operating system kernel and the upper-layer application through the following steps:

a) reading a data block;

b) verifying a signature using an authentication key in a data block signature certificate; and c) returning a trusted result if verification is trusted; and stopping guiding if verification fails.

Steps of data decryption are as follows:

a) acquiring the bus control right by the trusted chip;

b) invoking the root of trust for storage of the trusted chip to decrypt an encryption key 2 of the encrypted data in the data block, to generate an encryption key 1;

c) invoking the root of trust for storage of the trusted chip to decrypt the encrypted data section using the encryption key 1; and d) loading the decrypted data into the memory to guide the system.

The backup recovery system of the security processing unit comprises a bus arbitration chip, a system storage chip and a system backup chip of the security processing unit. The system storage chip saves the start guidance file, the operating system kernel and the upper-layer application code. The system backup chip saves the backup start guidance file, operating system kernel and upper-layer application code.

For the backup recovery system, when the system of the PLC hardware platform is started, the bus arbitration chip in the security processing unit is in a main control status. when starting, if the content in the system storage chip does not pass the verification, the bus arbitration chip issues a command and occupies the bus; backup recovery steps are as follows:

a) reading backup content from the system backup chip;

b) writing the backup content in the buffer module of the bus arbitration chip;

c) copying the data in the buffer module into the system storage chip;

d) setting write protection of the system storage chip by the bus arbitration chip to ensure that the information in the system storage chip is not modified and the size and the storage base address are set in the bus arbitration chip without being disclosed; and e) giving the bus control right to the system storage chip by the bus arbitration chip and guiding the system again after system recovery is completed.

The trusted chip adds an encryption module drive between a page high-speed caching layer and a common block layer which reserve a file system structure of an original system. The encryption process is transparent for an upper-layer user. The user does not feel the file encryption process and does not modify the data structure of the file system, and the access process of the encrypted file by the user is not changed.

The system storage chip comprises a virtual isolation technology. The start guidance file, the operating system kernel and the upper-layer application are placed in lowest addresses of the system storage chip in accordance with designated addresses; a drive file in a physical block device layer is modified; and parameter pos is required to be judged when writing into the physical block device layer. If pos is less than m address, an error is directly returned to ensure write protection of this section of address content. m value is required to be set in accordance with practical implementation.

Figure 1:
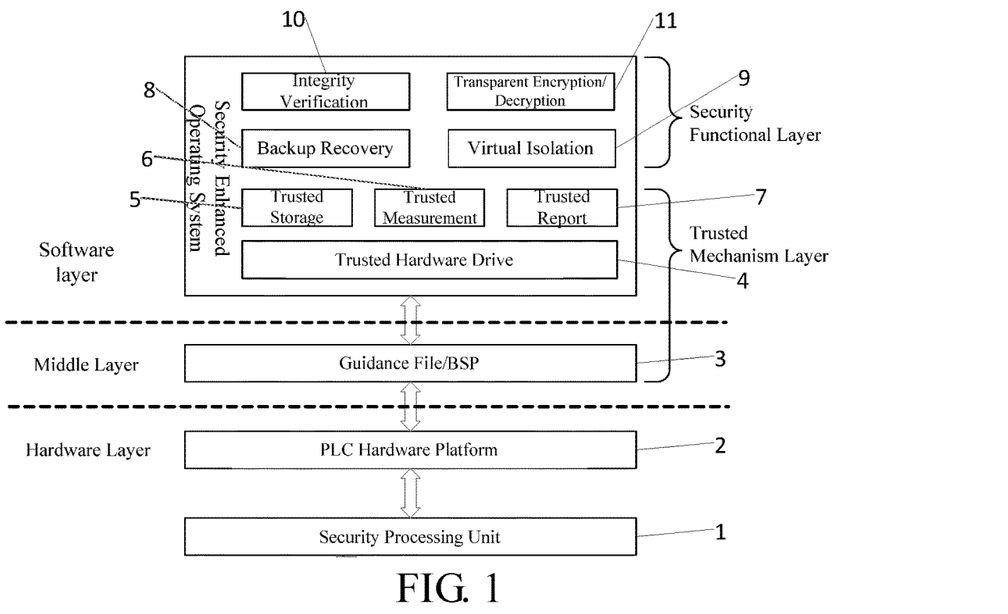
FIG. 1 is a structural schematic diagram of a trusted computing platform system of PLC.

FIG. 1 is a structural schematic diagram showing a trusted computing platform system of PLC in the present invention. In the figure, the hardware layer of the present invention is the security processing unit 1. The security processing unit 1 is the underlying hardware device realized by the trusted function, and is the first master device to perform self-verification. The PLC hardware platform 2 is a secondary device, and ensures that the hardware foundation of the architecture is trusted under the verification of the security processing unit 1. The software policy supplied by the software layer of the present invention comprises integrity verification 10, transparent encryption and decryption 11, backup recovery 8 and virtual isolation 9. In the implementation mode of the present invention, the security processing unit 1 is activated before the PLC hardware platform 2 is started, and is responsible for bus arbitration of the PLC hardware platform 2.

Figure 2:
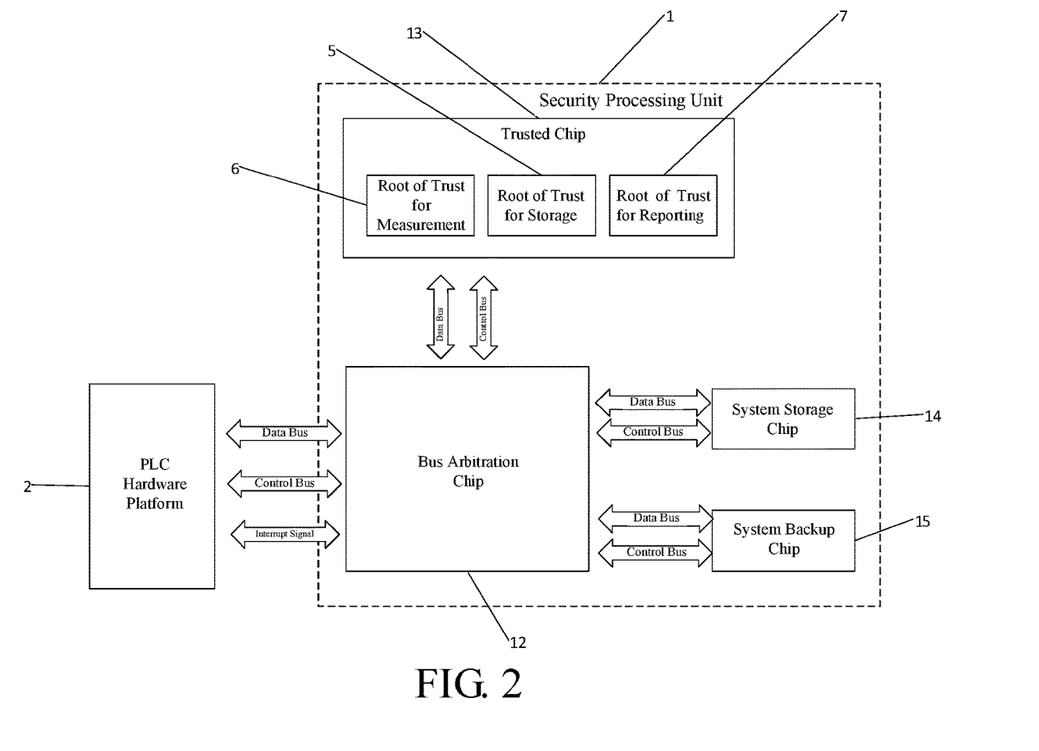
FIG. 2 is a structural schematic diagram of a security processing unit.
Figure 13:
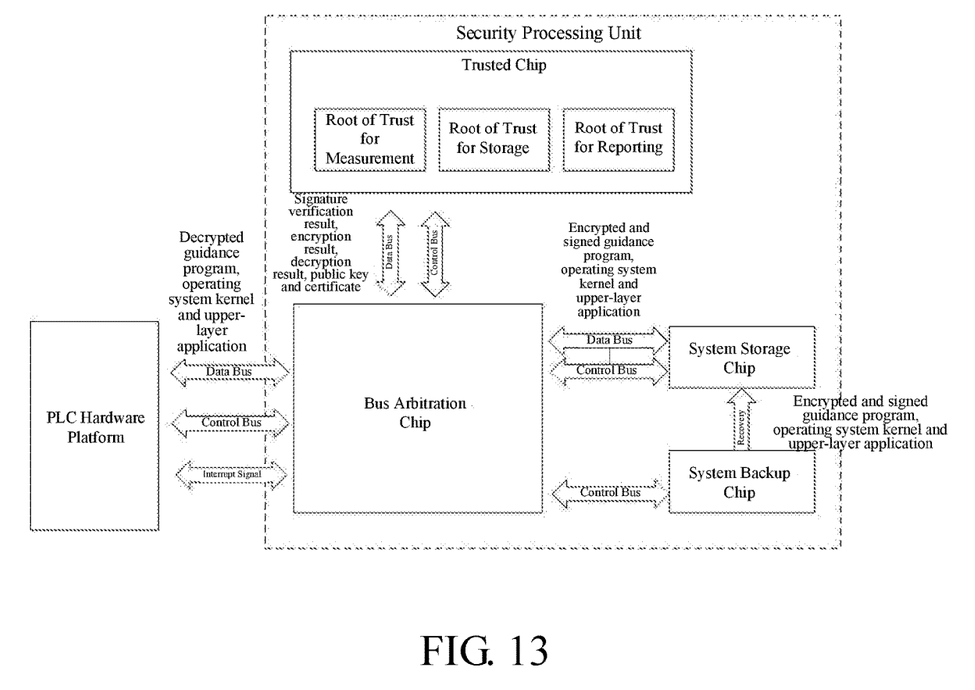
FIG. 13 is a structural schematic diagram of a security processing unit.

FIG. 2 is a structural schematic diagram showing the security processing unit 1 in the present invention. The security processing unit 1 of the present invention comprises a bus arbitration chip 12, a trusted chip 13, a system storage chip 14 and a system backup chip 15. As shown in FIG. 13, in the implementation mode of the present invention, the bus arbitration chip 12 allocates the bus resources. When a plurality of main modules simultaneously occupy a shared bus to conduct data communication, the bus arbitration chip 12 determines the use right of the bus resources. The main modules comprise, for example, a PLC hardware platform 2, a trusted chip 13, a system storage chip 14 and a system backup chip 15.

In the implementation mode of the present invention, the trusted chip 13 stores the root of trust for measurement 6, the root of trust for storage 5, and the root of trust for reporting 7. The root of trust for measurement 6 is used to measure the integrity of bottom configuration, the upper-layer application, etc. in the PLC system. For example, during starting of PLC, when the integrity of the guidance file, the system kernel and the upper-layer application is measured, the root of trust for measurement is used. The root of trust for storage 5 is used to conduct the work of key production, key management, encryption and decryption to protect all keys and measurement information entrusted to the root of trust for storage. For example, after completing the integrity measurement on the upper-layer application, the root of trust for measurement transmits measurement results to the root of trust for storage. The root of trust for reporting 7 allows a verified challenger to acquire data in a region protected by the security processing unit 1, comprises the data in the system storage chip 14, and confirms validity of the data with signature keys.

In the implementation mode of the present invention, the system storage chip 14 encrypts and regionally stores the guidance file, the system kernel and the upper-layer application. The encrypted storage is to encrypt write data before practical memory write operation is executed. The regional storage is to separate regions which store system data and user data without changing each other.

In the implementation mode of the present invention, the system backup chip 15 is a protected system backup memory, and saves the guidance file of the PLC system, the system kernel and the upper-layer application. The security processing unit is used to conduct integrity checking on the guidance file, the system kernel and the upper-layer application before the PLC is started; and if checking is not passed, contents are regarded to have been tampered and system recovery is needed.

Figure 3:
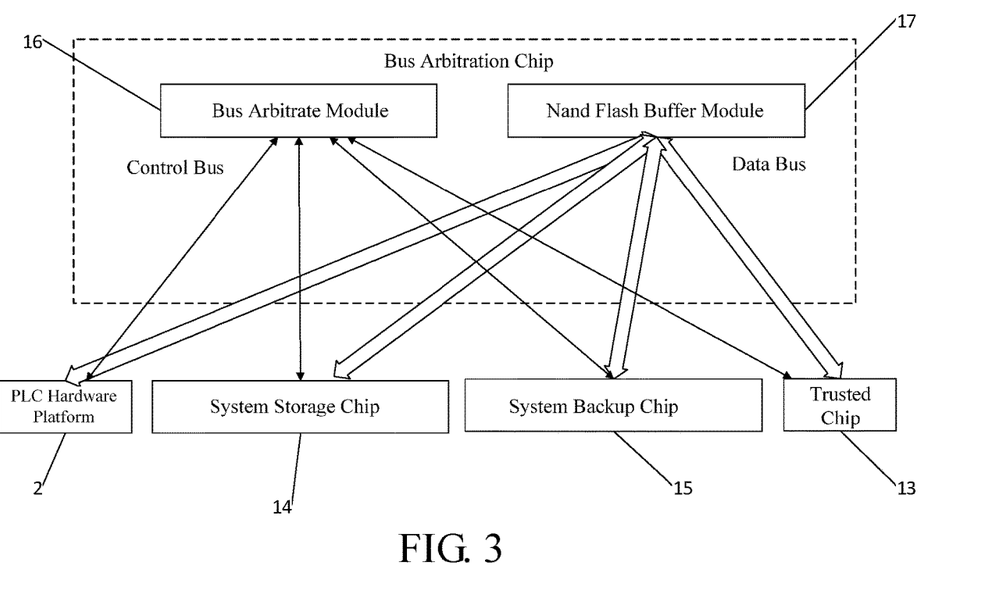
FIG. 3 is a structural schematic diagram of a bus arbitration chip.

FIG. 3 is a structural schematic diagram showing the bus arbitration chip 12. The bus arbitration chip 12 of the present invention comprises a bus arbitration module 16 and a Nand Flash buffer module 17.

In the implementation mode of the present invention, bus arbitration module 16 is in a centralized arbitration manner. All of the main modules occupy the bus resources through an independent arbitration module. The bus arbitration module 16 is used as a static arbitration algorithm (including a bus arbitration start method and backup recovery) in the arbitration process. The arbitration process is not influenced by the states of the main modules. One of the main modules occupying the bus resources is determined in accordance with a preset start process. The main modules comprise, for example, a PLC hardware platform 2, a trusted chip 13, a system storage chip 14 and a system backup chip 15.

In the implementation mode of the present invention, the bus arbitration start method is a PLC system start guidance method based on a trusted mechanism. The guidance method is to combine the PLC hardware platform 2 with the security processing unit 1, make the system storage chip 14 in the PLC hardware platform 2 independent and control the system storage chip 14 to read and write by the bus arbitration module in the security processing unit 1. In the process of starting the PLC hardware platform 2, integrity verification is conducted on the executable codes in the system storage chip 14 by the trusted chip in the security processing unit 1 at first; and only after verification is passed, the security processing unit 1 gives read and write rights of the system storage chip 14 to the PLC hardware platform 2 to allow to start the PLC hardware platform 2.

In the implementation mode of the present invention, after the system is electrified and started, the bus arbitration chip 12 in the security processing unit 1 is operated at first; the bus control right of the system storage chip 14 is acquired through the bus arbitrate module 16 in the bus arbitration chip 12; then the start guidance file, the operating system kernel, the upper-layer application and other codes in the system storage chip 14 are read into the Nand Flash buffer module 17; and the root of trust for measurement in the trusted chip is used to conduct integrity check on the buffer data. If check is passed, the bus arbitrate module 16 arbitrates the bus control right of the system storage chip 14 and the bus control right of the trusted chip 13 to the PLC hardware platform 2; then the PLC hardware platform 2 is started and operated; otherwise, an error is prompted.

In the implementation mode of the present invention, after the PLC hardware platform 2 acquires the bus control right of the system storage chip 14 and the bus control right of the trusted chip 13, the root of trust for storage 5 in the trusted chip 13 is invoked to decrypt the ciphertext stored in the system storage chip 14 into clear data and load the clear data into the memory.

In the implementation mode of the present invention, the bus arbitration module 16 controls the PLC hardware platform 2, the trusted chip 13, the system storage chip 14 and the system backup chip 15 to exchange data through the Nand Flash buffer module 17.

Figure 4:
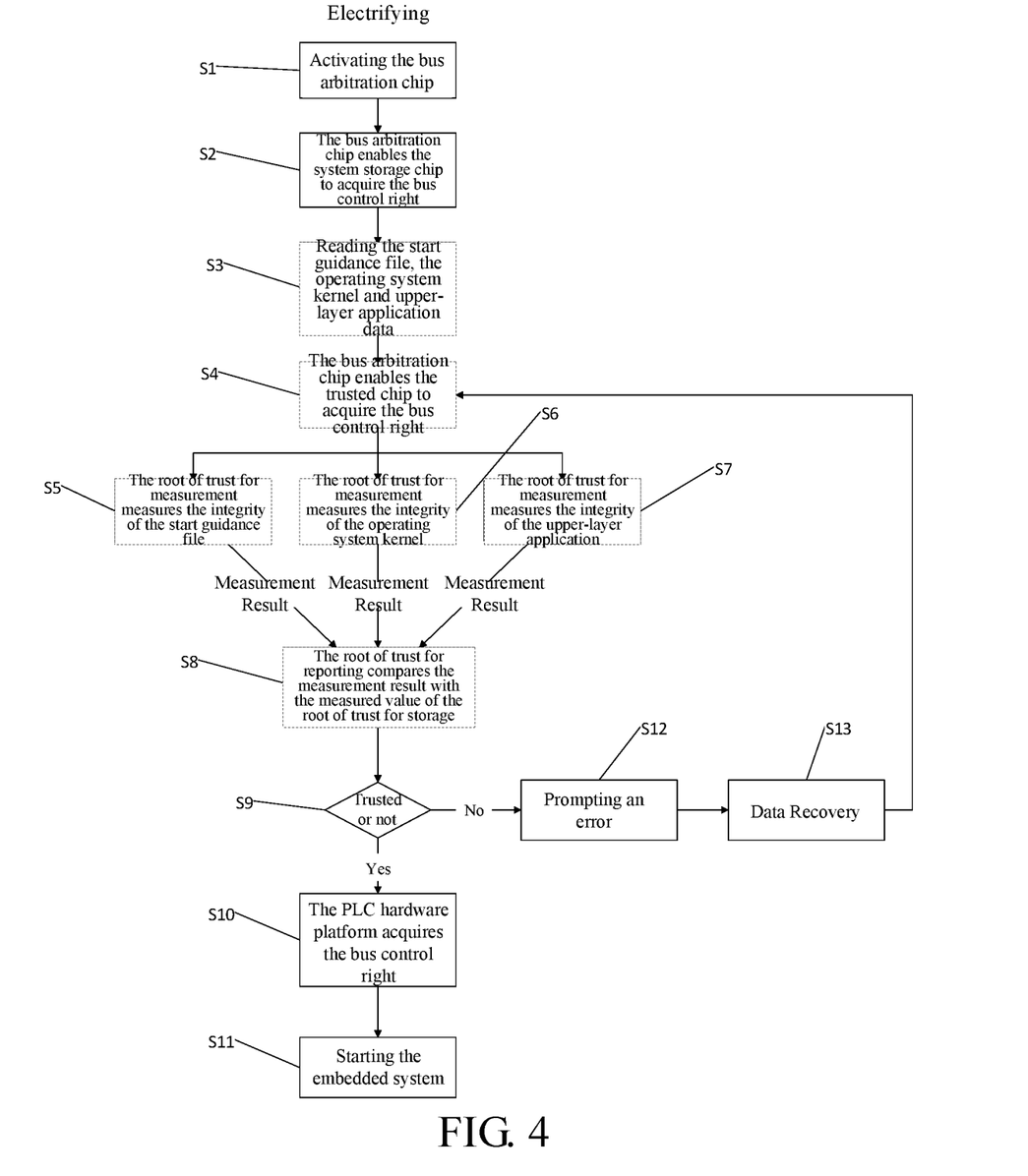
FIG. 4 is a start flow chart of a bus arbitration mechanism.

FIG. 4 shows a start process of the bus arbitration mechanism in the embodiment. In the figure, the system is electrified and step S1 of activating the bus arbitration chip 16 is executed; then step S2 of acquiring the bus control right of the system storage chip 14 is executed; next step S3 of reading the start guidance file, the operating system kernel and upper-layer application data is executed; then step S4 of acquiring the control right of the trusted chip 13 by the bus arbitration chip 16 is executed; the root of trust for measurement of the trusted chip is used to execute step S5 of verifying the integrity of the start guidance file, step S6 of verifying the integrity of the operating system kernel and step S7 of verifying the integrity of the upper-layer application; then step S8 of comparing whether the measurement result of the root of trust for reporting 7 is consistent with the measured value of the root of trust for storage is executed by the trusted chip 13; if the verification in step S9 is trusted, step S10 of acquiring the bus control right by the PLC hardware platform 2 is executed; and finally, step S11 of starting the embedded system is executed. If the verification in step S9 is not trusted, step S12 of prompting an error is executed; and finally step S13 of recovering system data is executed and step S4 is reexecuted.

Figure 5:
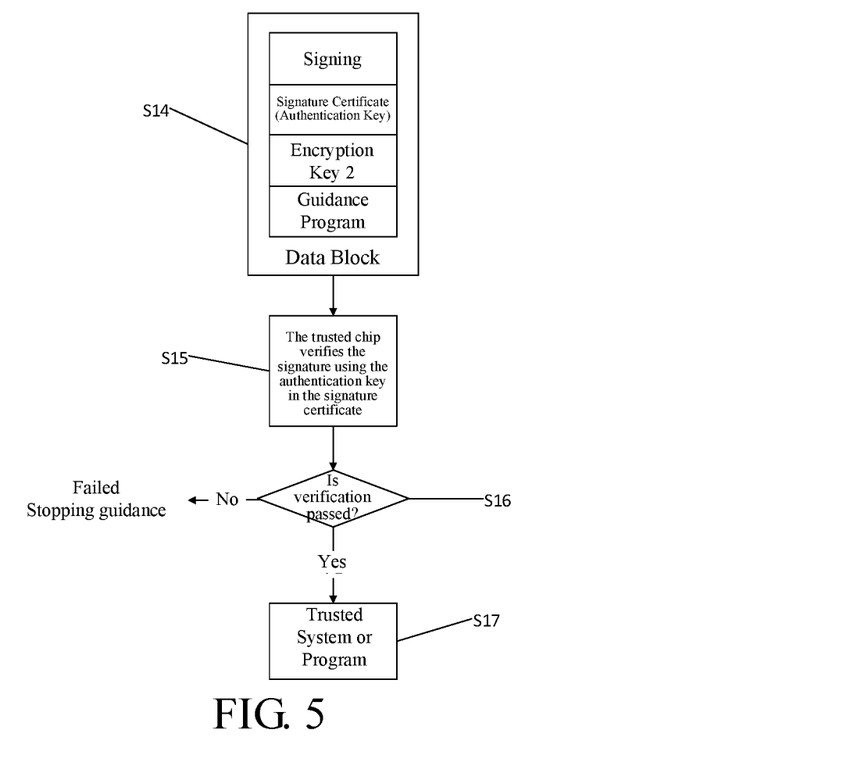
FIG. 5 is a flow chart of integrity measurement of a trusted chip on a guidance file.

FIG. 5 shows a process of integrity measurement of the trusted chip on the guidance file in the embodiment. In the figure, step S14 of reading the data block is executed, and then step S15 of verifying a signature by the trusted chip 13 using an authentication key in a data block signature certificate is executed. A trusted result of S17 is returned if the verification in S16 is trusted. Guiding is stopped if the verification fails.

Figure 6:
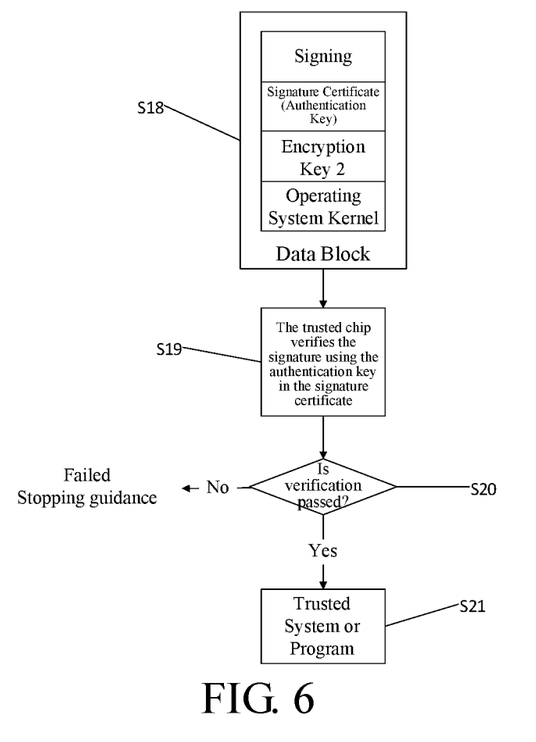
FIG. 6 is a flow chart of integrity measurement of a trusted chip on an operating system kernel.

FIG. 6 shows a process of integrity measurement of the trusted chip on the operating system kernel in the embodiment. In the figure, step S18 of reading the data block is executed, and then step S19 of verifying a signature by the trusted chip 13 using an authentication key in a data block signature certificate is executed. A trusted result of S21 is returned if the verification in S20 is trusted. Guiding is stopped if the verification fails.

Figure 7:
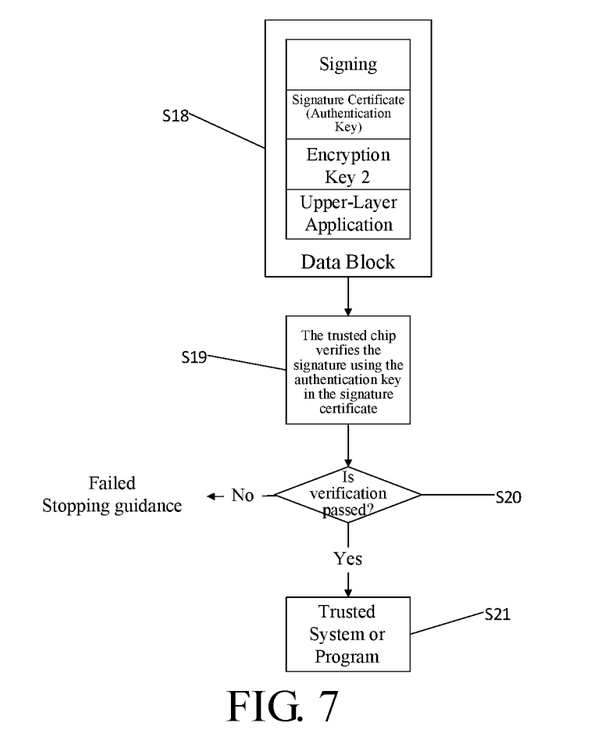
FIG. 7 is a flow chart of integrity measurement of a trusted chip on an upper-layer application.

FIG. 7 shows a process of integrity measurement of the trusted chip on the upper-layer application in the embodiment. In the figure, step S22 of reading the data block is executed, and then step S23 of verifying a signature by the trusted chip 13 using an authentication key in a data block signature certificate is executed. A trusted result of S25 is returned if the verification in S24 is trusted. Guiding is stopped if the verification fails.

Figure 8:
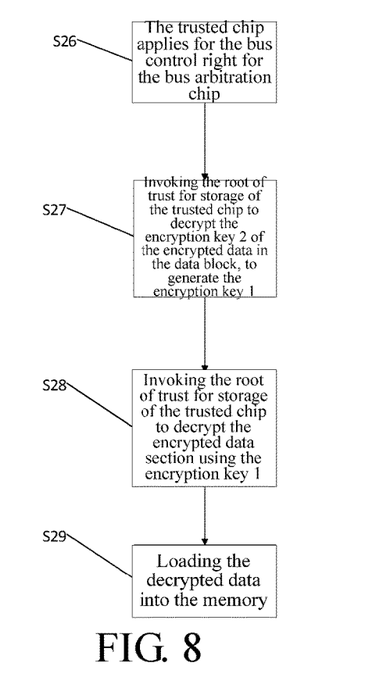
FIG. 8 is a flow chart of starting an embedded system.

FIG. 8 is a process of starting an embedded system in the embodiment. In the figure, step S26 of applying for the bus control right for the bus arbitration chip 12 by the trusted chip 13 is executed; then step S27 of invoking the root of trust for storage 5 of the trusted chip 13 is executed; the encryption key 2 of the encrypted data in the data block is decrypted to generate the encryption key 1; next step S28 of invoking the root of trust for storage 5 of the trusted chip 13 is executed; the encrypted data section is decrypted using the encryption key 1; and finally step S29 of loading the decrypted data into the memory is executed, the system is guided and the application program is loaded.

Figure 9:
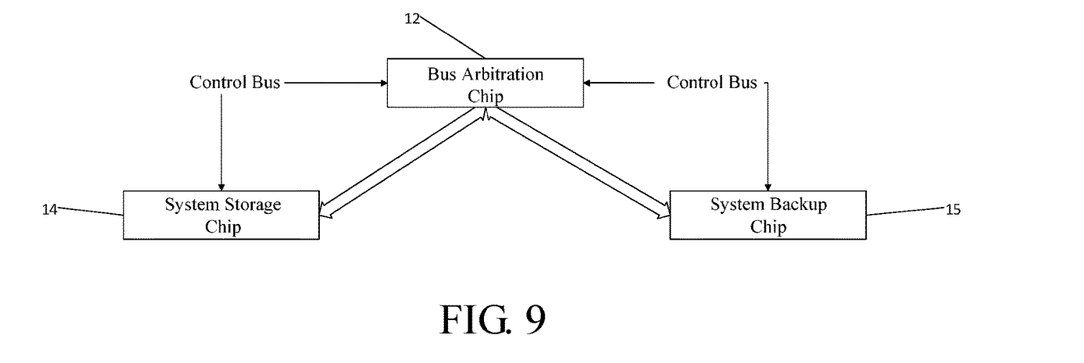
FIG. 9 is a structural schematic diagram of a backup recovery system.

FIG. 9 is a backup recovery architecture of the system. The backup recovery system of the present invention comprises a bus arbitration chip 12, a system storage chip 14 and a system backup chip 15. The system storage chip 14 saves the start guidance file, the operating system kernel and the upper-layer application code. The system backup chip 15 saves the backup start guidance file, operating system kernel and upper-layer application code.

In the implementation mode of the present invention, after the content in the system storage chip 14 is maliciously destructed or modified, the content can be recovered by the system backup chip 15 so as to normally start the system of the PLC hardware platform 2.

In the implementation mode of the present invention, before the system of the PLC hardware platform 2 is started, the bus arbitration chip 12 in the security processing unit 1 is in a main control status. During trusted measurement, if the content in the system storage chip 14 does not pass the verification, the bus arbitration chip 12 issues a command and the system backup chip 15 occupies the bus resources; backup content is read from the system backup chip 15; the backup content is then written in the Nand Flash buffer module 17 of the bus arbitration chip 12; and then the content in the buffer module is copied into the system storage chip 14. The bus arbitration chip 12 sets write protection of the system storage chip 14 to ensure that the information in the system storage chip 14 is not modified and the size and the storage base address are set in the bus arbitration chip 12 without being disclosed. The system storage chip 14 acquires the bus control right to restart the guidance after system recovery is completed.

Figure 10:
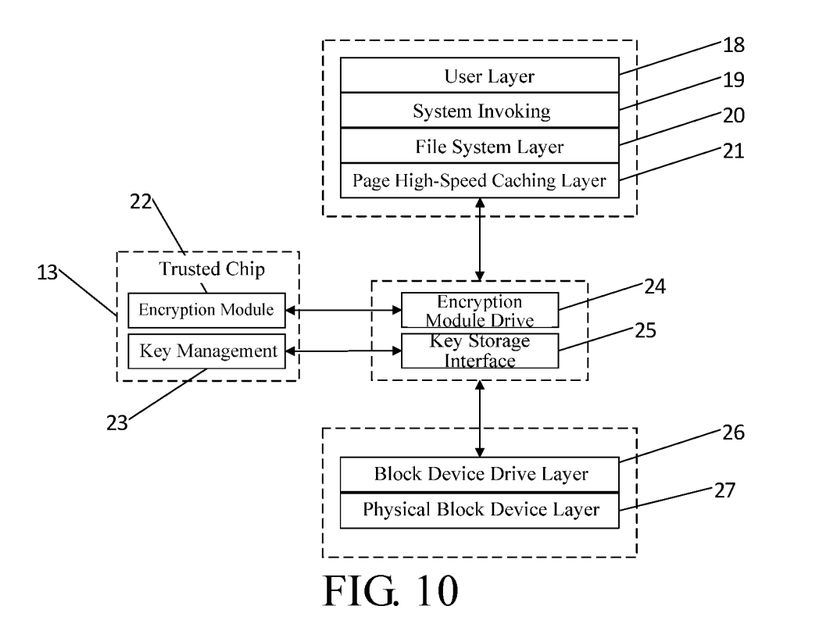
FIG. 10 is an architectural schematic diagram of a transparent encryption and decryption technology.

FIG. 10 shows a schematic diagram of transparent encryption and decryption. In the present invention, the file system structure of the original system is reserved and a data encryption and decryption function is added between a page high-speed caching layer 21 and a common block layer 26. The system is transparent for an upper-layer user. The user does not feel the file encryption process and does not modify the data structure of the file system, and the access process of the encrypted file by the user is not changed.

Figure 11:
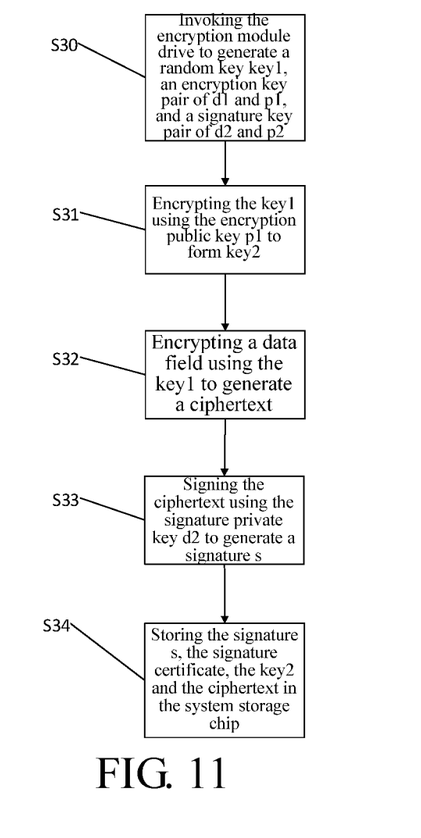
FIG. 11 is a flow chart of data encryption.

FIG. 11 is a data encryption process in the embodiment. In the figure, step S30 of invoking the encryption module drive to generate a random key key1, an encryption key pair of d1 and p1, and a signature key pair of d2 and p2 is executed. Then, step S31 of encrypting the key1 using the encryption public key p1 to form key2 is executed. Next, step S32 of encrypting a data field using the key1 to generate a ciphertext is executed. Then, the ciphertext is signed using the signature private key d2 to generate a signature s. Finally, the signature s, the signature certificate, the key2 and the ciphertext are stored in the system storage chip.

Figure 12:
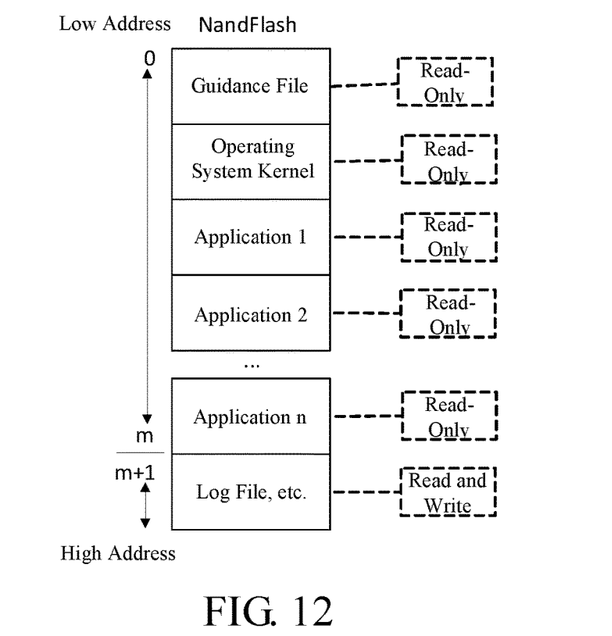
FIG. 12 is a schematic diagram of a virtual isolation technology.

FIG. 12 shows a virtual isolation technology. In the present invention, the start guidance file, the operating system kernel and the upper-layer application are placed in lowest addresses of the system storage chip 14 in accordance with designated addresses; a drive file in a physical block device layer 28 is modified; and parameter pos is required to be judged when writing into the physical block device layer 28. If pos is less than m address, an error is directly returned to ensure write protection of this section of address content. m value is required to be set in accordance with practical implementation.

We claim:

1. A security processing unit of PLC, comprising:
a bus arbitration chip used to allocate bus resources;
a trusted chip used to provide a root of trust for measurement, a root of trust for storage, and a root of trust for reporting;
a system storage chip used to save a start guidance file, an operating system kernel and an upper-layer application code; and
a system backup chip used to save the backup start guidance file, operating system kernel and upper-layer application code,
wherein the system storage chip encrypts and regionally stores the guidance file, the system kernel and the upper-layer application, wherein encrypting is to encrypt write data before practical memory write operation is executed and regionally storing is to separate a first region that stores system data from a second region that stores user data.

2. The security processing unit of PLC according to claim 1, wherein the bus arbitration chip conducts bus arbitration on the bus resources; and when a plurality of PLC hardware platforms, trusted chips, system storage chips and system backup chips simultaneously occupy a shared bus to conduct data communication, the bus arbitration chip determines the use right of the bus resources.

3. The security processing unit of PLC according to claim 1, wherein the trusted chip stores the root of trust for measurement, the root of trust for storage, and the root of trust for reporting;
the root of trust for measurement is used to measure the guidance file, the operating system kernel and the upper-layer application;
the root of trust for storage is used to conduct the work of key production, key management, encryption and decryption to protect all keys and measurement information entrusted to the root of trust for storage; and
the root of trust for reporting is used to allow a verified challenger to acquire data in a region protected by the trusted chip and to confirm validity of the data with signature keys.

4. The security processing unit of PLC according to claim 1, wherein the trusted chip adds an encryption module drive between a page high-speed caching layer and a common block layer which reserve a file system structure of an original system; and an encryption process is transparent for an upper-layer user, the data structure of the file system is not modified and the access process of the encrypted file by the user is not changed.

5. The security processing unit of PLC according to claim 1, wherein the system backup chip is used to conduct integrity checking on the guidance file, the system kernel and the upper-layer application before the security processing unit starts PLC; and if checking is not passed, contents are regarded to have been tampered and system recovery is needed.

6. A bus arbitration method for the security processing unit of PLC according to claim 1, comprising the following steps:
a) activating a bus arbitration chip after the security processing unit is electrified;
b) acquiring a bus control right of the system storage chip by the bus arbitration chip;
c) reading the start guidance file, the operating system kernel and upper-layer application data in the system storage chip to Nand Flash buffer module in the bus arbitration chip;
d) acquiring the control right of the trusted chip by the bus arbitration chip, and measuring the integrity of the guidance file, the operating system kernel and the upper-layer application by the root of trust for measurement of the trusted chip;
e) if the measurement is trusted, acquiring the bus control right by the PLC hardware platform, reading the data of the Nand Flash buffer module, decrypting and loading into a memory, and starting the system; and
f) if the measurement fails, recovering the system data and guiding again.

7. The bus arbitration method for the security processing unit of PLC according to claim 6, wherein the root of trust for measurement of the trusted chip measures the integrity of the guidance file, the operating system kernel and the upper-layer application through the following steps:
a) reading a data block;
b) verifying a signature using an authentication key in a data block signature certificate; and
c) returning a trusted result if verification is trusted; and stopping guiding if verification fails.

8. The bus arbitration method for the security processing unit of PLC according to claim 6, wherein the bus arbitration method also comprises a backup recovery method; when the system of the PLC hardware platform is started, the bus arbitration chip in the security processing unit is in a main control status; when starting, if the content in the system storage chip does not pass the verification, the bus arbitration chip issues a command and occupies the bus; backup recovery steps are as follows:
  a) reading backup content from the system backup chip;
  b) writing the backup content in the Nand Flash buffer module of the bus arbitration chip;
  c) copying the data in the buffer module into the system storage chip;
  d) setting write protection of the system storage chip by the bus arbitration chip to ensure that the information in the system storage chip is not modified and the size and the storage base address are set in the bus arbitration chip without being disclosed; and
  e) giving the bus control right to the system storage chip by the bus arbitration chip and guiding the system again after system recovery is completed.

* * * * *